(12) United States Patent
Takakura (10) Patent No.: US 8,599,170 B2
(45) Date of Patent: Dec. 3, 2013

(54) OPTICAL POINTING DEVICE AND ELECTRONIC EQUIPMENTS

(75) Inventor: Hideya Takakura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 648 days.

(21) Appl. No.: 12/854,271

(22) Filed: Aug. 11, 2010

(65) Prior Publication Data

US 2011/0074736 A1    Mar. 31, 2011

(30) Foreign Application Priority Data

Sep. 25, 2009   (JP) ................. 2009-220598

(51) Int. Cl.
*G06F 3/045*     (2006.01)
*H01H 21/04*     (2006.01)
*F21V 7/04*      (2006.01)

(52) U.S. Cl.
USPC ............................ 345/175; 200/313; 362/615

(58) Field of Classification Search
USPC ............................ 345/175; 200/313; 362/615
See application file for complete search history.

(56) References Cited

U.S. PATENT DOCUMENTS

2007/0152985 A1*   7/2007   Ostergaard et al. .......... 345/176
2011/0032185 A1    2/2011   Yamamoto et al.

FOREIGN PATENT DOCUMENTS

| JP | 5-313816 | 11/1993 |
|---|---|---|
| JP | 2001-344065 | 12/2001 |
| JP | 2009-20204 | 1/2009 |
| JP | 2009-21018 A | 1/2009 |
| KR | 10-2006-0088589 A | 8/2006 |
| WO | 2005/088435 A1 | 9/2005 |
| WO | 2006/011711 A1 | 2/2006 |
| WO | 2006/019218 A1 | 2/2006 |
| WO | WO 2009/020204 A1 | 2/2009 |

* cited by examiner

*Primary Examiner* — Ariel Balaoing
(74) *Attorney, Agent, or Firm* — Birch, Stewart Kolasch & Birch, LLP (57) ABSTRACT

Light emitted from a light source such as LED and reflected by a fingertip is guided by a cover member onto a light receiving surface of an imaging element. A second resin part is provided that is in contact with the cover member and a resin molded part sealing the imaging element. The reflected light guided by the cover member is made to reach the light receiving surface via the second resin part and the resin molded part, traveling along a path spaced apart from an air layer.

9 Claims, 6 Drawing Sheets

OPTICAL POINTING DEVICE AND ELECTRONIC EQUIPMENTS

TECHNICAL FIELD

The present invention relates to an optical pointing device and particularly to an optical pointing device adapted for installation in portable information terminals such as cellular phones. The present invention also relates to electronic equipment having the optical pointing device.

BACKGROUND ART

Portable information terminals such as cellular phones and PDAs (Personal Digital Assistants) have conventionally employed user interfaces using keypads, which are composed of a plurality of buttons for input of numbers and characters and direction buttons.

In recent years, display units of portable information terminals have been made capable of displaying graphics and usable in two-dimensional manner. In nowadays when functions of portable information terminals are brought near to those of computers with operations of the terminals made complex, methods of performing operations for desired functions with use of the menu keys and other function keys as direction keys have been becoming difficult to employ as a method of input into such portable information terminals because the operations cannot be performed easily. Accordingly, demands have been increasing for pointing devices that can be operated like mice and touch pads used in computers.

In such a background, there has been proposed a method of extracting change in a contact surface by observing, by an imaging element, a pattern of a fingertip or the like in contact with a pointing device. There has been also proposed a method of converting a motion of a fingertip into input signals by illuminating a contact surface with a light source, imaging a pattern of the contact surface on an imaging element by lenses, and detecting change in the pattern.

For instance, such a pointing device is disclosed in WO 2006/011711 A1 (Patent Literature 1).

The pointing device has a cover glass, a light source part, and a light receiving part, and the light source part is composed of a light source and a light source guide. Light emitted from the light source is reflected at a specified angle and is then projected onto the cover glass. The light projected onto the cover glass and having penetrated an upper surface of the cover glass is reflected by a surface of a finger. The light reflected by the surface of the finger penetrates a back surface and is projected onto the light receiving part. The light receiving part is composed of a reflecting mirror, a condenser lens and an optical image sensor. The light reflected by the reflecting mirror is imaged by the condenser lens so as to be provided to the optical image sensor. As the optical pointing device, there are proposed a device filled with air as medium between the optical components and a device employing an optical waveguide for minimizing the loss of the light therebetween.

Another optical pointing device is disclosed in WO 2006/019218 A1 (Patent Literature 2).

The optical pointing device has a first waveguide, a second waveguide, an image sensor, a cover glass, and a light source part. The first waveguide has a first reflecting surface and a first planoconvex lens that form a single body, and the second waveguide has a second planoconvex lens and a second reflecting surface that form a single body.

Light emitted from the light source is projected onto an object and is reflected by the object. The light reflected by the object is refracted by the first reflecting surface and the refracted light is then condensed while passing through the first and second planoconvex lenses. The light having passed through the first and second planoconvex lenses is refracted by the second reflecting surface and is imaged on the image sensor. Spaces between the optical components are filled with air as medium.

Still another optical pointing device is disclosed in WO 2005/088435 A1 (Patent Literature 3).

The optical pointing device is composed of a light source for emitting light to an object, an object plane for receiving the light emitted from the light source, an optical lens for reflecting an image from an image acquisition surface, and an optical sensor for receiving the image reflected from the optical lens and converting the image into an electrical signal. Spaces between the components are filled with air as medium.

Citation List

Patent Literature

Patent Literature 1: WO 2006/011711 A1
Patent Literature 2: WO 2006/019218 A1
Patent Literature 3: WO 2005/088435 A1

SUMMARY OF INVENTION

Technical Problem

The inventor found out that the conventional optical pointing devices may cause deterioration in optical properties resulting from the loss of light and/or may fail to satisfactorily detect displacement of a finger.

The inventor also found out that these problems are caused by imaging optical systems of the conventional optical pointing devices making use of air layers between the optical components. In the conventional devices, the light is refracted because of difference between refractive indices of the components and a refractive index of air. Accordingly, variation in gaps between the components that is caused by variation in assembly, use for long time, impact from the exterior provided by vibrations or the like, etc. may cause the loss of the light, which may deteriorate the optical properties. This may make it impossible to satisfactorily detect displacement of the finger. Additionally, deposit of dust, foreign matter, and/or the like in the gaps may also deteriorate the optical properties.

An object of the invention is to provide an optical pointing device and electronic equipment that have optical properties resistant to deterioration and that are excellent in product quality.

Solution to Problem

In order to solve the problem, an optical pointing device according to an aspect of the present invention comprises a light source for irradiating an object; a light guide member for guiding light emitted from the light source and reflected by the object; an imaging element having a light receiving surface for receiving the light guided by the light guide member; a first resin part sealing the imaging element; and a second resin part in contact with the light guide member and the first resin part such that the light guided by the light guide member reaches the light receiving surface via the second resin part and the first resin part.

According to the invention, the light emitted from the light source, reflected by the object, and guided by the light guide member reaches the light receiving surface via the second resin part and the first resin part and is thus prevented from coming into contact with any air layers in a path from the light guide member to the light receiving surface. Thus prevented are refraction of the light that may be caused by difference between refractive indices of the components and a refractive index of air, variation in gaps between the components that may be caused by variation in assembly, use for long time, impact from the exterior provided by vibrations or the like, etc., and deterioration in optical properties that may be caused by loss of the light. Additionally prevented is deterioration in the optical properties that may be caused by deposit of dust, foreign matter, and/or the like in the gaps. Therefore, the optical properties resist being deteriorated and displacement of a finger can satisfactorily be detected.

According to the invention, the prevention of the variation that might be caused by the gaps between the components ensures excellent product quality, increases a yield, and improves productivity.

In one embodiment, the first resin part has a recess on a side thereof facing the light guide member, and the second resin part fills the recess.

According to the embodiment, the first resin part having the recess on the side thereof facing the light guide member and the second resin part filling the recess permit a thickness of a product to be reduced. Thus a thin optical pointing device can be provided.

According to the embodiment, because a thickness of the second resin part can be considered to be equivalent to a depth of the recess, formation of the recess with high precision in advance ensures accurate adjustment of the thickness of the second resin part, remarkable improvement in product quality, and excellent optical properties.

In one embodiment, the recess opens in a direction or directions generally perpendicular to a direction of a normal line of the light receiving surface.

According to the embodiment, the recess opens in the direction(s) generally perpendicular to the direction of the normal line of the light receiving surface. When the recess is filled with the second resin part, therefore, excess resin can be made to escape to outside through the opening(s) of the recess. Accordingly, a quantity of the resin in the second resin part can easily be controlled and application of the resin can be stabilized.

Electronic equipment according to another aspect of the present invention comprises the above-described optical pointing device of the invention.

According to the invention, the provision of the optical pointing device of the invention ensures remarkable improvement in operability and quality retainability for an operation part.

Advantageous Effects of Invention

According to the optical pointing device of the invention, in the optical path for imaging light reflected from an object on the imaging element, the reflected light reaches the imaging element without passing through any air layers. Thus the reflected light reaches the imaging element without refraction in air layers. Additionally, deposit of foreign matter such as dust between the optical components is prevented. Accordingly, variation of individual difference that might be caused by contact of the reflected light with air layers is prevented, so that productivity and product quality can remarkably be improved.

According to the optical pointing device of one embodiment, the first resin part having the recess on a surface thereof on the side of the light guide member and the second resin part filling the recess permit the second resin part to be easily and reliably brought into contact with both the light guide member and the first resin part. In addition, the thickness of the second resin part can accurately be controlled and can be reduced, so that reduction in thickness and attainment of compactness can be effected. Besides, strength of the optical pointing device itself against external pressures can be increased.

BRIEF DESCRIPTION OF DRAWINGS

The present invention will become more fully understood from the detailed description given hereinbelow and the accompanying drawings which are given by way of illustration only, and thus are not intended to limit the present invention, and wherein.

DESCRIPTION OF EMBODIMENTS

Hereinbelow, embodiments of the invention will be described with reference to examples of optical pointing devices employing an LED as a light source module. The invention, however, is not limited to configurations of the embodiments below.

(First Embodiment)

Figure 1:
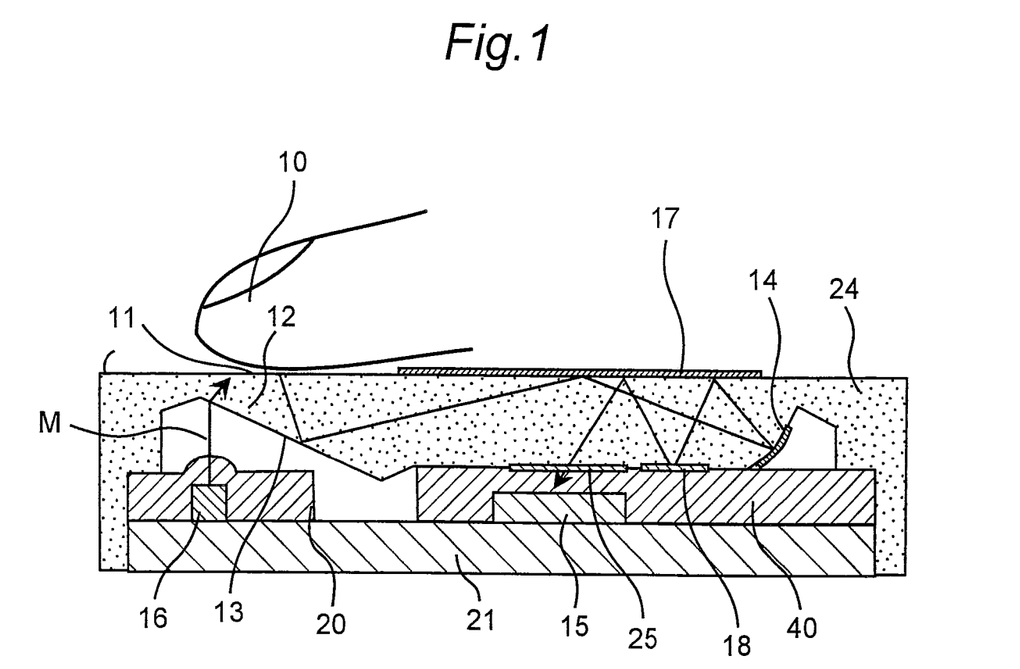
FIG. 1 is a schematic section for illustrating an optical pointing device in accordance with a first embodiment of the invention.

FIG. 1 is a schematic section of an optical pointing device in accordance with a first embodiment of the invention.

The optical pointing device has a circuit board 21, an LED 16 as an example of a light source, a light source side resin molded part 20, a cover member 24 as an example of a light guide member, an imaging element 15, a resin molded part 40 as a first resin part, and a second resin part 25.

The LED 16 irradiates a fingertip 10 as an object. The LED 16 is placed under the cover member 24 and is sealed with the light source side resin molded part 20. The cover member 24 has a contact surface 11. The contact surface 11 is placed opposite to the LED 16 with respect to the cover member 24. A back surface part 13 of the cover member 24 that resides in a direction of emission of light from the LED 16 so as to overlie the LED 16 is slanted with respect to an optical axis M of light emitted from the LED 16, in the section of FIG. 1, so as to form a slope.

The light emitted from the LED 16 penetrates the back surface part 13 of the cover member 24 while being refracted and thereafter irradiates the contact surface 11 of the cover member 24 from a direction slanted obliquely with respect to the optical axis M of the light emitted from the LED 16.

In operation, the fingertip 10 that is the object is in contact with the contact surface 11. The light projected onto the fingertip 10 from the direction slanted with respect to the optical axis M is reflected and scattered by a back surface of the fingertip 10. For the sake of better understanding of a state of the finger with respect to the optical pointing device, the fingertip 10 is depicted in FIG. 1 on a scale smaller than the real in relation to the optical pointing device.

An image of the fingertip 10 is captured from the contact surface 11 that is a top surface, with respect to a vertical direction, of a prism part 12 serving as a ray bending element of the cover member 24. The image of the finger that is incident on the prism part 12 undergoes total reflection on the back surface (slope) 13, and then reflection on a top surface 17 of the cover member 24, on a reflecting lens 14, which is an imaging element, on the top surface 17 of the cover, on a bottom surface 18 thereof, and on the top surface 17, and then passes through the second resin part 25 and the resin molded part 40, and finally is focused on the imaging element 15. The focused image of the fingertip 10 is captured as image data.

The imaging element 15 is sealed with the resin molded part 40. The second resin 25 is in contact with both the cover member 24 and the resin molded part 40. In other words, there is no air layer between the second resin 25 and the cover member 24 and there is no air layer between the second resin 25 and the resin molded part 40. Thus the image is focused on the imaging element 15 without being refracted greatly.

The image focused on the imaging element 15 is captured as image data into a DSP (Digital Signal Processor) not shown. The imaging element 15 is an image sensor such as a CMOS image sensor or a CCD sensor, which continues picking up images of the contact surface 11 at uniform intervals. Once the fingertip 10 as the object is moved, an image thereof that is picked up is shifted by a given amount from an image that was picked up immediately before. The DSP compares amounts of the shift of the same portion of the image and thereby determines an amount and a direction of movement of the fingertip 10. More specifically, the image data obtained from the imaging element 15 is subjected to image processing so that movement of a fingerprint on the fingertip 10 reflected in the contact surface 11 is extracted and that the amount and the direction of the movement of the fingertip 10 is determined.

For the cover member 24, polycarbonate resin of visible-light absorbing type is preferably used. Epoxy- or silicone-based resin can preferably be used for the light source side resin molded part 20 and the resin molded part 40 that seal the LED 16 and the imaging element 15, respectively. For means for the sealing can be used molding such as typical transfer molding, injection molding, and potting. Material by which light having wavelengths other than an emission wavelength can be cut off is preferably used for components that the emitted light penetrates because the material provides countermeasures against disturbance light, stray light and the like. Material of the second resin part 25 for eliminating the air layer is preferably capable of cutting off light having wavelengths other than an LED emission wavelength and achieving high degree of adherence to the cover member 24 and the resin molded part 40. As the material, epoxy-based or silicone-based resin can preferably be used. The second resin part 25 preferably employs material having a refractive index as close to refractive indices of the cover member 24 and the resin molded part 40 as possible.

Figure 2A:
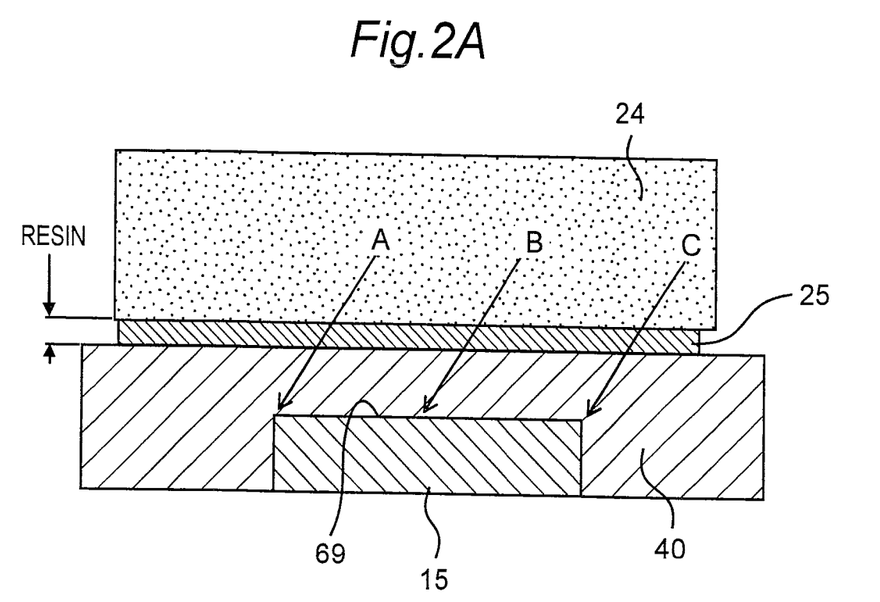
FIG. 2A is an enlarged schematic view of an area including a joint part between a resin molded part on an imaging element and a cover member in the optical pointing device of the embodiment.
Figure 2B:
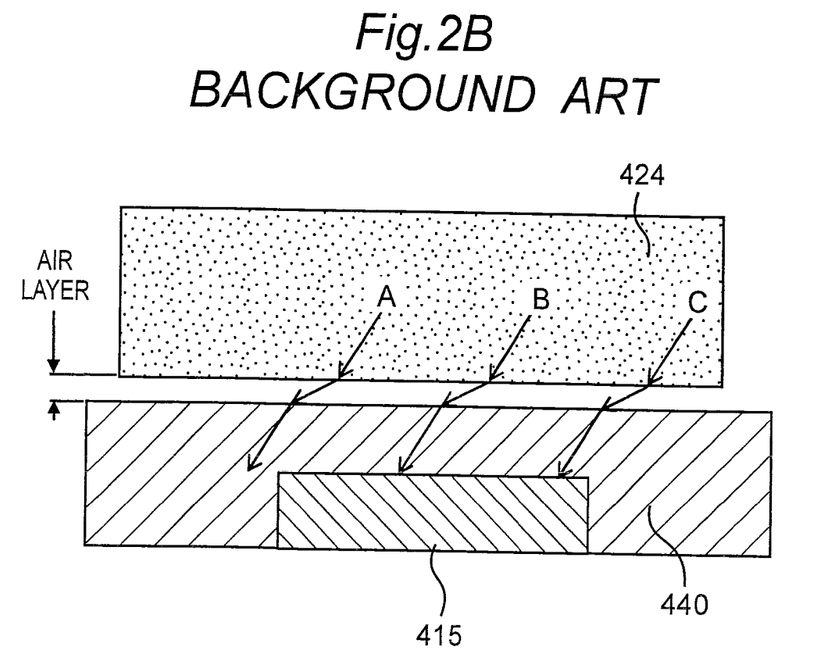
FIG. 2B is an enlarged schematic view of an area including a joint part between a resin molded part on an imaging element and a cover member in a conventional optical pointing device.

FIG. 2A is an enlarged schematic view of an area including a joint part between the resin molded part 40 on the imaging element 15 and the cover member 24 in the optical pointing device of the embodiment. FIG. 2B is an enlarged schematic view of an area including a joint part between a resin molded part 440 on an imaging element 415 and a cover member 424 in a conventional optical pointing device.

Referring to FIG. 2B, in which no resin is applied between the cover member 424 and the resin molded part 440 sealing the imaging element 415, refraction of reflected light is caused by a difference in refractive index between the cover member 424 and air and a difference in refractive index between the resin molded part 440 and air. The wider a gap therebetween is, accordingly, the more difficult it is to transmit correct optical signals to the imaging element 415. That is, malfunction of the optical pointing device may be caused by occurrence of the gap resulting from variation on occasion of assembly, external pressures, vibrations or the like. The malfunction may also be caused by dust, foreign matter, and/or the like, which are prone to come into the gap.

In contrast to that, the present invention shown in FIG. 2A has a configuration in which a part corresponding to the gap is occupied by the resin molded part 25 as the second resin part and which is thus resistant to occurrence of a gap. Therefore, the invention reduces the refraction of the reflected light, and is more resistant to malfunction of the optical pointing device than the configuration with the air layer, even if a distance in the gap is increased.

In addition, the second resin part 25 makes it possible to bond the cover member 24 to the resin molded part 40 therethrough while eliminating the air layer. This results in provision of the optical pointing device that has an increased strength against external pressures and that yields excellent results in environmental tests such as heat cycle test.

(Second Embodiment)

Figure 3A:
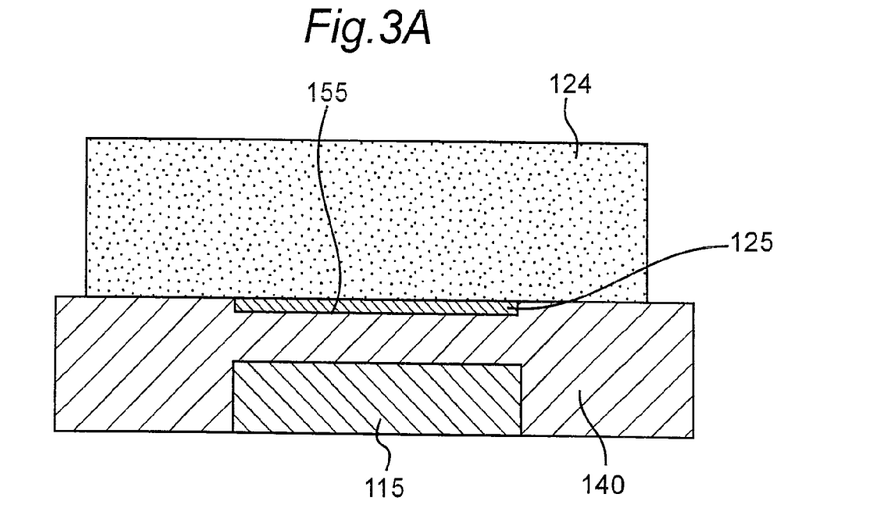
FIG. 3A is a schematic section of an optical pointing device in accordance with a second embodiment of the invention.
Figure 3B:
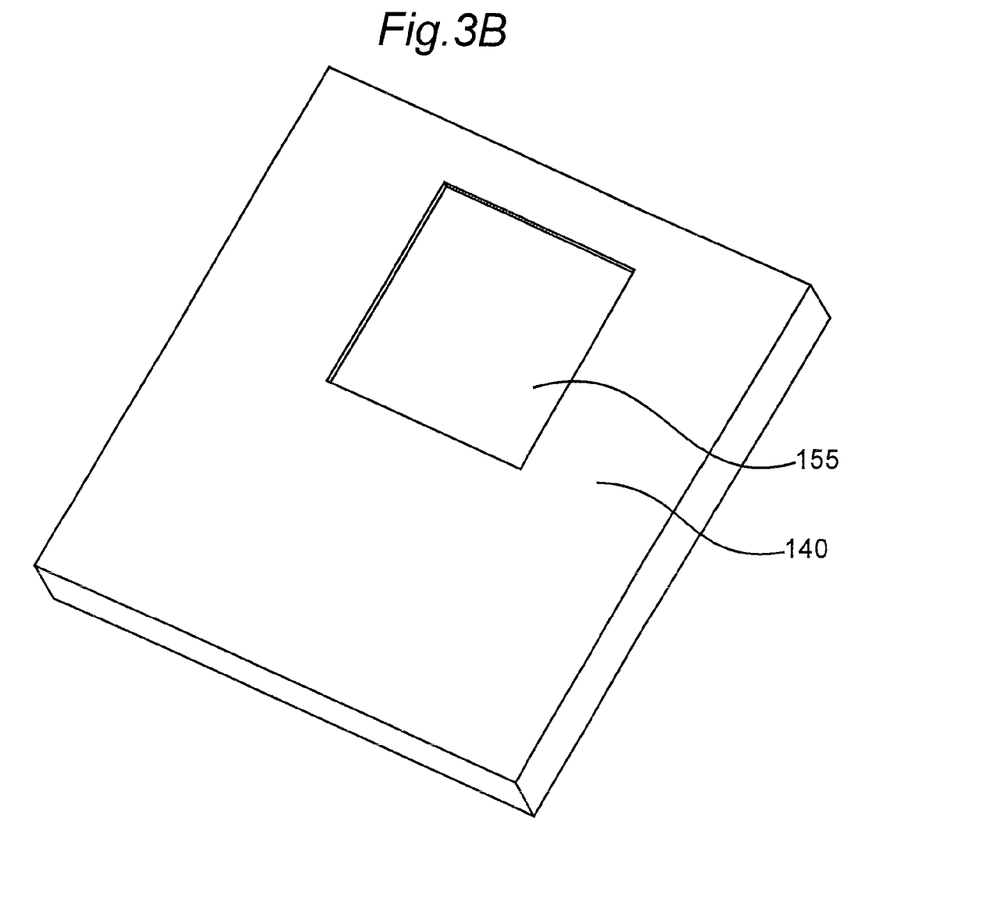
FIG. 3B is a perspective view of a resin molded part, as seen from a cover member side, on an imaging element in the optical pointing device in accordance with the second embodiment.

FIG. 3A is a schematic section of an optical pointing device in accordance with a second embodiment of the invention. FIG. 3B is a perspective view of a resin molded part 140, as seen from a cover member side, on an imaging element in the optical pointing device in accordance with the second embodiment.

In the second embodiment, as shown in FIG. 3A, a recess (difference in level) 155 is formed on a portion of a surface facing the cover member 124 of the resin molded part 140 as a first resin part sealing the imaging element 115, and is filled with a second resin part 125.

According to the second embodiment, a thickness of resin of the second resin part 125 can easily be set equal to a depth of the recess 155. Therefore, the second resin part 125 can easily be formed into a desired shape, and optical properties can be made excellent.

Absence of the recess 155 might cause the second resin part to be interposed and pressed between the cover member and the resin molded part and to escape to outside. This might incur a possibility of occurrence of air layers between the cover member and the resin molded part, variation in the thickness of resin of the second resin part, and/or the like, which would make the optical properties inadequate.

(Third Embodiment)

Figure 4A:
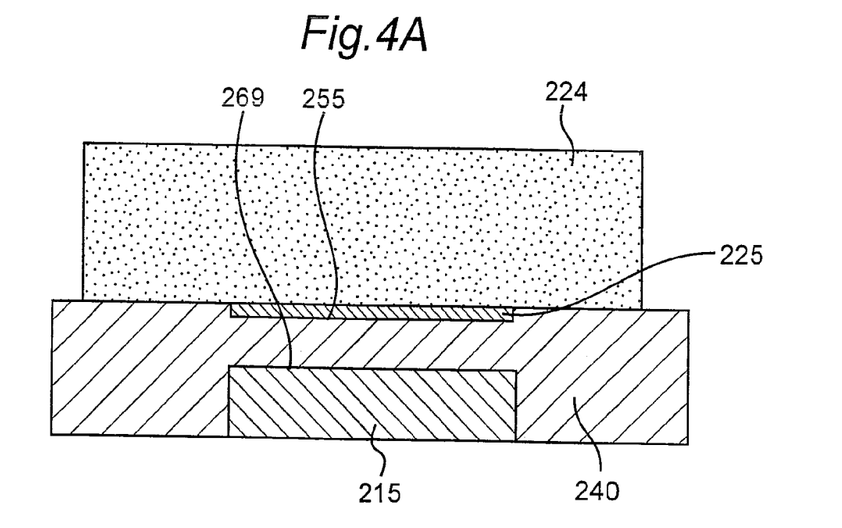
FIG. 4A is a schematic section of an optical pointing device in accordance with a third embodiment of the invention.
Figure 4B:
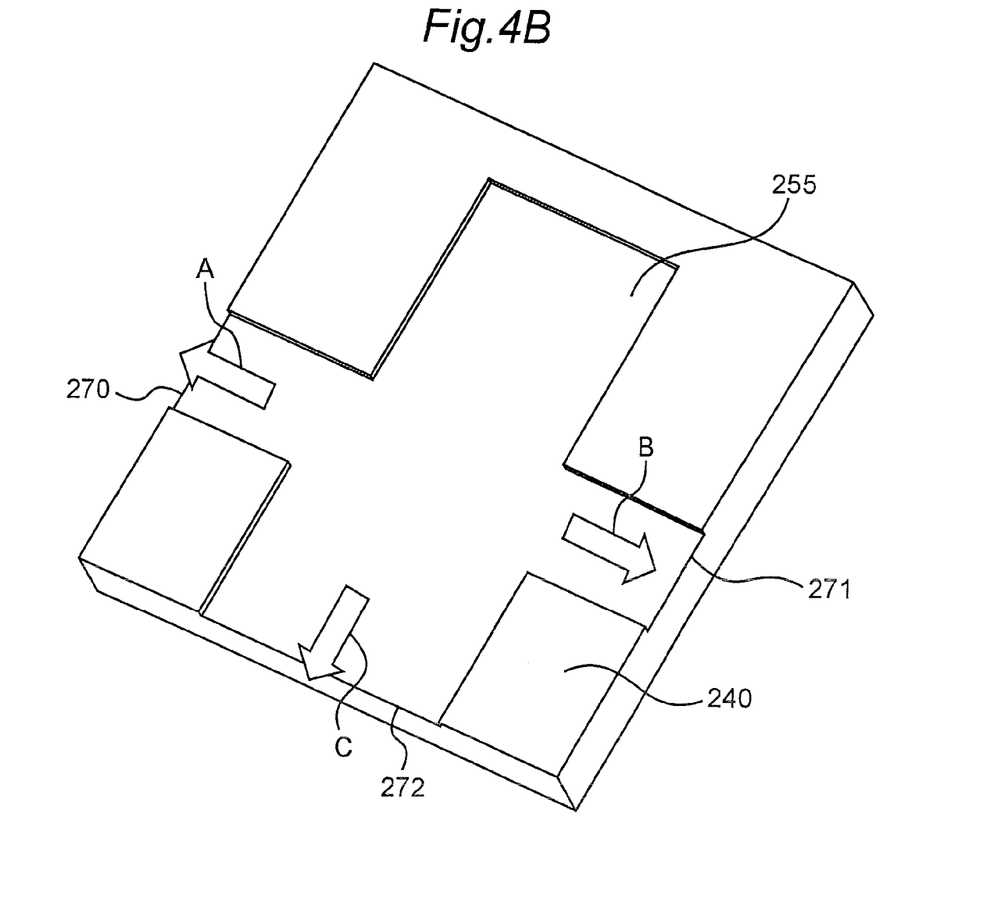
FIG. 4B is a perspective view of a resin molded part, as seen from a cover member side, on an imaging element in the optical pointing device in accordance with the third embodiment.

FIG. 4A is a schematic section of an optical pointing device in accordance with a third embodiment of the invention. FIG. 4B is a perspective view of a resin molded part, as seen from a cover member side, on an imaging element in the optical pointing device in accordance with the third embodiment.

In the third embodiment, a recess (difference in level) 255 is formed on a portion of a surface facing the cover member 224 of the resin molded part 240 as a first resin part sealing the imaging element 215. As shown in FIG. 4B, the recess 255 opens in three directions out of directions generally perpendicular to a direction of a normal line of a light receiving surface 269 (see FIG. 4A) of the imaging element 215. That is, the recess 255 is shaped like a cross and opens on three side surfaces of the rectangular resin molded part 240.

According to the optical pointing device of the third embodiment, extending to the side surfaces of the resin molded part 240, the recess 255 opens in the directions generally perpendicular to the direction of the normal line of the light receiving surface 269 of the imaging element 215. When the recess 255 is filled with the second resin part 125, therefore, excess thereof can be made to flow in directions shown by arrows A, B, and C in FIG. 4B and can be discharged to outside through openings 270, 271, and 272. That is, the openings 270, 271, and 272 serve as flow parts for resin. Accordingly, the recess 255 can be filled with the second resin part 125 so that neither gap nor excess resin exists. Thus a quantity of the second resin can easily be controlled and the second resin part can stably be applied to the recess 255 regardless of individual difference. In the third embodiment, the recess 255 of the resin molded part 240 sealing the imaging element 215 has the three openings 270, 271, and 272. In the invention, however, the recess of the resin molded part sealing the imaging element may have one opening or two, four or more openings.

(Fourth Embodiment)

Figure 5A:
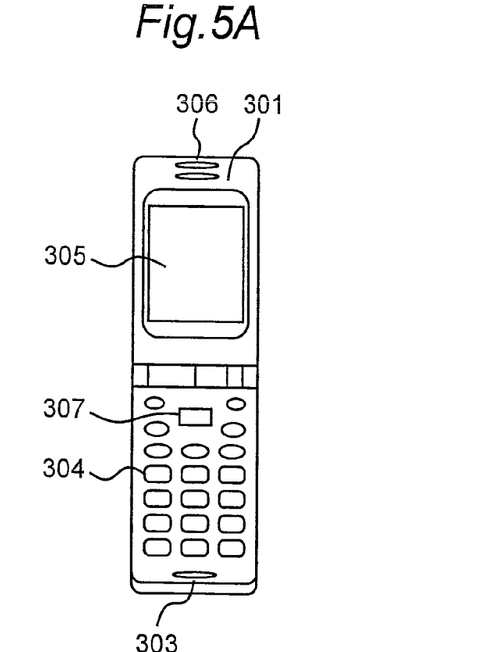
FIG. 5A is a front view of a cellular phone in accordance with a fourth embodiment of the invention.
Figure 5B:
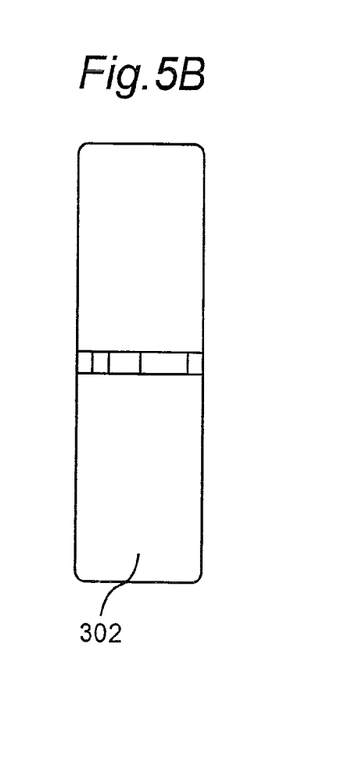
FIG. 5B is a rear elevation of the cellular phone of the fourth embodiment.
Figure 5C:
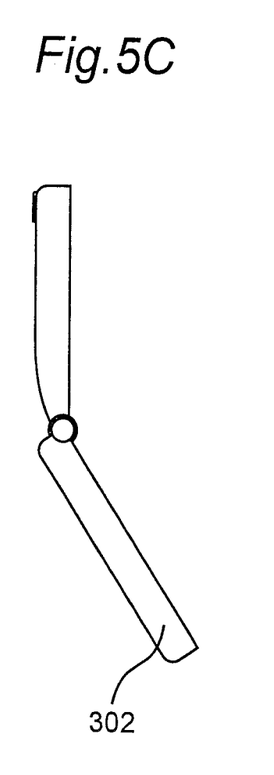
FIG. 5C is a side view of the cellular phone of the fourth embodiment.

FIG. 5A is a front view of a cellular phone in accordance with a fourth embodiment of the invention, and FIG. 5B is a rear elevation of the cellular phone. FIG. 5C is a side view of the cellular phone.

As shown in FIGS. 5A and 5B, the cellular phone as the portable information terminal has a monitor side enclosure 301, an operation side enclosure 302, a mike part 303, ten-keys 304, a monitor part 305, a speaker part 306, and an optical pointing device 307 of the invention.

The speaker part 306 and the mike part 303 are used for input and output of audio information. The monitor part 305 is used for output of video information and is used, in the fourth embodiment, also for display of information inputted from the optical pointing device 307.

In the fourth embodiment, as shown in FIG. 5A, the optical pointing device 307 is placed above the ten-keys 304. A manner of placement and orientation of the optical pointing device 307, however, are not limited thereto, as a matter of course.

The cellular phone of the fourth embodiment is of folding type having an upper enclosure and a lower enclosure connected to each other through hinges as shown in FIGS. 5A through 5C. It is needless to say, however, that cellular phones in which the optical pointing device of the invention can be installed are not limited to those of folding type. Nevertheless, mainstream of cellular phones is of folding type as in the fourth embodiment and those having thicknesses not larger than 10 mm in folded state have been emerging. In consideration of portability, the thickness thereof is a critical factor.

In the operation side enclosure 302 shown in FIGS. 5B and 5C, components defining or determining a thickness thereof are the mike part 303, the ten-keys 304, and the optical pointing device 307, in disregard for internal circuit boards and the like not shown. The optical pointing device 307 is the thickest of those components. Therefore, reduction in a thickness of the optical pointing device 307 is critical because that directly leads to reduction in the thickness of the cellular phone. As described with reference to FIGS. 3A, 3B and 4A, 4B, reduction in the thickness of the optical pointing device of the invention can easily be attained. Accordingly, the cellular phone of the fourth embodiment can easily be reduced in thickness and made compact.

Though the optical pointing device of the invention is installed in the cellular phone in the fourth embodiment, the optical pointing device of the invention can of course be installed not only in cellular phones but also in PDAs, personal computer system units, microwave ovens or any other electronic equipment having input devices. Also, it should be understood that the light source usable in the optical pointing device of the invention is not limited to LED but may be a light emitting device such as semiconductor laser element, other than LED.

REFERENCE SIGNS LIST

10: fingertip
11: contact surface
12: prism part
13: back surface
14: reflecting lens
15, 115, 215, 415: imaging element
16: LED
17: top surface of a cover member
18: bottom surface of the cover member
20: resin molded part
21: circuit board
24, 124, 224, 424: cover member
25, 125, 225: second resin part
40, 140, 240, 440: resin molded part
69, 269: light receiving surface
155, 255: recess
270, 271, 272: opening
301: monitor side enclosure
302: operation side enclosure
303: mike part
304: ten-keys
305: monitor part
306: speaker part
307: optical pointing device

The invention claimed is:

1. An optical pointing device comprising:
a light source for irradiating an object;
a light guide member for guiding light emitted from the light source and reflected by the object, the light guide member having a top surface including a reflecting surface and a contact surface, the object being in contact with the contact surface, and a bottom surface including a reflecting surface and a part opposed to the light source;
an imaging element having a light receiving surface substantially parallel with the top surface of the light guide member for receiving the light guided by the light guide member;
a first resin part sealing the imaging element; and
a second resin part above the light receiving surface of the imaging element and substantially parallel both with the top surface of the light guide member and with the light receiving surface of the imaging element, the second resin part being in contact with a part of the bottom surface of the light guide member in which no reflecting surface is provided and the first resin part such that the light guided by the light guide member reaches the light receiving surface via the second resin part and then the first resin part.

2. An optical pointing device, comprising:
a light source for irradiating an object;
a light guide member for guiding light emitted from the light source and reflected by the object;
an imaging element having a light receiving surface for receiving the light guided by the light guide member;
a first resin part sealing the imaging element; and
a second resin part in contact with the light guide member and the first resin part such that the light guided by the light guide member reaches the light receiving surface via the second resin part and the first resin part, wherein
the first resin part has a recess on a side thereof facing the light guide member, and wherein the second resin part fills the recess.

3. The optical pointing device as claimed in claim 2, wherein
the recess opens in a direction generally perpendicular to a direction of a normal line of the light receiving surface.

4. Electronic equipment comprising the optical pointing device as claimed in claim 1 and an enclosure.

5. The optical pointing device as claimed in claim 1, wherein
the second resin part is made of a material having a refractive index close to refractive indices of materials of the light guide member and the first resin.

6. The optical pointing device as claimed in claim 1, wherein
the part opposed to the light source of the light guide member is slanted with respect to a direction of emission of light from the light source.

7. The optical pointing device as claimed in claim 6, wherein
the light source and the light guide member are configured and arranged such that at least a part of light emitted from the light source penetrates the slanted part of the light guide member while being refracted and thereafter irradiates the contact surface of the light guide member from a direction slanted obliquely with respect to the direction of emission of light from the light source.

8. The optical pointing device as claimed in claim 6, wherein
at least part of the light reflected by the object undergoes total reflection on the slanted part of the light guide member, followed by reflections on the reflecting surfaces of the top and bottom surfaces so as to be guided within the light guide member, and then passes through the second resin part and then the first resin part to finally reach the light receiving surface of the imaging element.

9. The optical pointing device as claimed in claim 1, further comprising a digital signal processor configured and arranged such that an image of the object picked up by the imaging element is captured as an image data into the digital signal processor,
wherein the object is an object that moves in contact with the contact surface, and
wherein the digital signal processor is further configured to compare amounts of shift of a same portion of the image of the object and thereby determine an amount and a direction of movement of the object.

* * * * *